United States Patent
Zhou et al.

(10) Patent No.: US 8,895,143 B2
(45) Date of Patent: Nov. 25, 2014

(54) DOUBLE CORE-SHELL FLUORESCENT MATERIALS AND PREPARATION METHODS THEREOF

(75) Inventors: Mingjie Zhou, Guangdong (CN); Wenbo Ma, Guangdong (CN); Shuxin Lu, Guangdong (CN); Yewen Wang, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 0 days.

(21) Appl. No.: 13/637,708

(22) PCT Filed: Mar. 31, 2010

(86) PCT No.: PCT/CN2010/071485
§ 371 (c)(1),
(2), (4) Date: Sep. 27, 2012

(87) PCT Pub. No.: WO2011/120227
PCT Pub. Date: Oct. 6, 2011

(65) Prior Publication Data
US 2013/0017395 A1    Jan. 17, 2013

(51) Int. Cl.
B05D 5/06    (2006.01)
B32B 5/16    (2006.01)
B32B 15/02   (2006.01)
B82Y 30/00   (2011.01)
C09K 11/02   (2006.01)
C09K 11/77   (2006.01)

(52) U.S. Cl.
CPC ............. *C09K 11/7769* (2013.01); *C09K 11/02* (2013.01); *C09K 11/7787* (2013.01); *C09K 11/7792* (2013.01); *Y10S 977/773* (2013.01)
USPC ....... 428/402.24; 428/404; 427/157; 977/773

(58) Field of Classification Search
CPC ............. B05D 5/06; B32B 5/16; B32B 15/02
See application file for complete search history.

(56) References Cited

U.S. PATENT DOCUMENTS

| 4,287,229 A | 9/1981 | Watanabe et al. |
| 2006/0105170 A1* | 5/2006 | Dobson et al. ............... 428/403 |
| 2006/0202167 A1 | 9/2006 | Landry et al. |

FOREIGN PATENT DOCUMENTS

| EP | 1473347 A1 | 11/2004 |
| JP | H11-181419 A | 7/1999 |

(Continued)

OTHER PUBLICATIONS

Communication From the European Patent Office Regarding a Counterpart Foreign Application Dated Aug. 14, 2013.

(Continued)

*Primary Examiner* — Randy Gulakowski
*Assistant Examiner* — Jeffrey Washville
(74) *Attorney, Agent, or Firm* — Rosenberg, Klein & Lee

(57) ABSTRACT

Double core-shell fluorescent materials and preparation methods thereof are provided. The double core-shell fluorescent materials include inner core, inner shell coating the inner core and outer shell coating the said inner shell. The inner core is metal particle and the chemical constitution of the inner shell is silicon dioxide. The outer shell is fluorescent powder represented by the following chemical formula: $(R_{1-x}, Eu_x)_2O_3$, wherein R is Y, Gd or combination thereof, $0.02 \leq x \leq 0.1$. The double core-shell fluorescent materials with uniform and stable luminous effect not only increase luminous intensity, but also decrease usage amount of fluorescent powder by using metal particle as inner core.

13 Claims, 5 Drawing Sheets

(56) References Cited

FOREIGN PATENT DOCUMENTS

| | | |
|---|---|---|
| JP | 2003-212540 A | 7/2003 |
| JP | 2005-537653 A | 12/2005 |
| WO | 2007/020416 A1 | 2/2007 |

OTHER PUBLICATIONS

Communication From the Japanese Patent Office Regarding a Counterpart Foreign Application Dated (Emperor Year H26) Mar. 4, 2014.

* cited by examiner

DOUBLE CORE-SHELL FLUORESCENT MATERIALS AND PREPARATION METHODS THEREOF

FIELD OF THE INVENTION

The present disclosure relates to luminescence materials technologies, and more particularly relates to a double core-shell fluorescent materials and preparation methods thereof.

BACKGROUND OF THE INVENTION

Rare earth luminescent material has become an important class of optoelectronic materials. In recent years, with the development of high-definition displays such as CRT, PDP, FED, etc., the requirement on the morphology of the phosphor has become increasingly high. It is usually considered the phosphor exhibiting a uniform particle size distribution, distribution of monodisperse, non-reunion, and spherical has a better application performance, because this type of phosphor has advantages such as high packing density, low light scattering, high resolution, and high brightness.

In considering of that, various methods have been developed to optimize the morphology of the phosphor. For example, urea was used as precipitant to prepare $(Y, Tb)_2O_3$ by coprecipitation so as to obtain a spherical phosphor with uniform particle size distribution. However, this spherical phosphor needs to use higher amounts of rare earth raw materials, thus increasing the manufacturing costs, so it is not suitable for industrial mass production and can not meet the wide range of application needs of the lighting display.

Nowadays, the preparation of dual core-shell fluorescent materials has become an important research focus in the field of luminescent materials. As for commercialization, the luminescent properties of obtained core-shell red fluorescent material is not ideal so far, and the luminous intensity needs for further improvement. For example, a $SiO_2@(Y, Eu)_2O_3$ phosphor is designed and prepared according to core-shell structure theory using $(Y, Eu)_2O_3$ to coat $SiO_2$. The phosphor can save the amount of the rare earth element. However, the prepared $SiO_2@(Y, Eu)_2O_3$ phosphor has a low luminous intensity, resulting in that it cannot achieve industrialization.

SUMMARY OF THE INVENTION

Technical Problems

In view of this, it is desired to provide a high luminous efficiency, luminous uniform and stable double core-shell fluorescent material.

And a simple, low cost preparation method of a double core-shell fluorescent material is also provided.

Technical Solutions

A double core-shell fluorescent material includes an inner core, an inner shell coating the inner core, and an outer shell coating the inner shell, the inner core is a metal particle, the chemical composition of the inner shell is silicon dioxide, the outer shell is phosphor represented by the following chemical formula: $(R_{1-x}, Eu_x)_2O_3$, wherein R is Y, Gd or a combination thereof, $0.02 \leq x \leq 0.1$.

A preparation method of a double core-shell fluorescent material includes the following steps:

obtaining a metal particle sol;

dissolving the metal particle sol into an alcohol solvent and weak alkaline solution, adding tetraethyl orthosilicate to react and preparing a suspension in which silicon dioxide coats a metal particle as an inner shell;

preparing a mixture solution containing at least one of yttrium nitrate and gadolinium nitrate with europium nitrate, adding a precipitant or gel, dissolving each nitrate salt and the precipitant or gel utilizing solvent, and adding the suspension in which silicon dioxide coats a metal particle as a inner shell to obtain a precursor of the double core-shell fluorescent material; and calcining the precursor of the double core-shell fluorescent material to form a phosphor outer shell coating the silicon dioxide inner shell and represented by the following chemical formula: $(R_{1-x}, Eu_x)_2O_3$, wherein R is Y, Gd or a combination thereof, $0.02 \leq x \leq 0.1$, and obtaining the double core-shell fluorescent material.

Beneficial Effects

The double core-shell fluorescent material, on the one hand, uses dual-core-shell structure to greatly reduce the amount of the phosphor, on the other hand, dual-core-shell structure is a monodisperse and can well disperse the phosphor, such that the particle size distribution uniformity and stability of the fluorescent material is increased, and the fluorescent material exhibits a uniform and stable luminous performance. In addition, since the metal particle is coated by the phosphor, the fluorescence can be enhanced via a surface plasma resonance produced by the metal particle, such that the double core-shell fluorescent material has a greatly improved emitting performance compared with the conventional fluorescent material, such as $SiO_2@(Y, Eu)_2O_3$. Referring to the preparation method, the double core-shell fluorescent material is obtained by sol-gel method or precipitation method with two steps of coating, which is simple, easy to control, and has a low cost, thus having broad prospects for production applications.

BRIEF DESCRIPTION OF THE DRAWINGS

These and other objects, advantages, purposes and features will become apparent upon review of the following specification in conjunction with the drawings.

DETAILED DESCRIPTION

Figure 1:
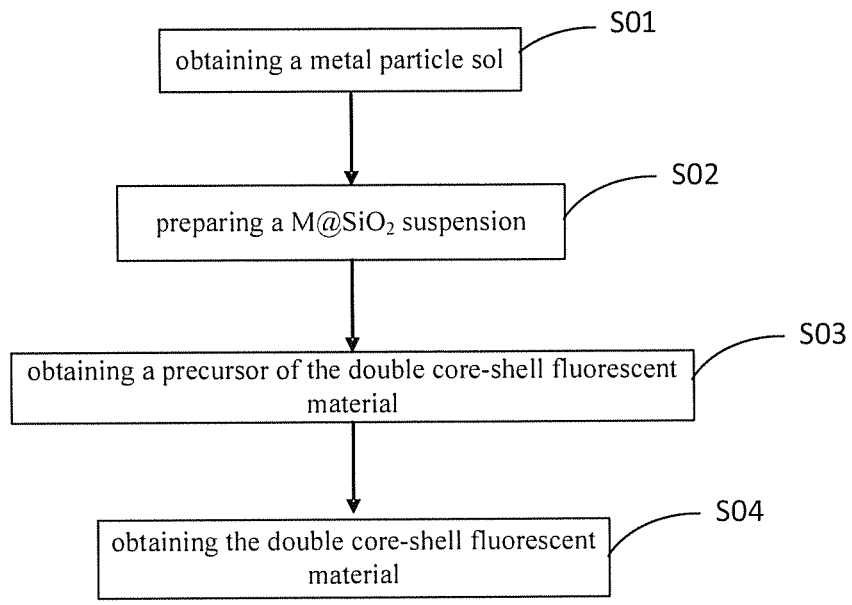
FIG. 1 is a flowchart of an embodiment of a method for preparing a double core-shell fluorescent material of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

The present disclosure provides an embodiment of a double core-shell fluorescent material, which includes an inner core, an inner shell coating the inner core, and an outer shell coating the inner shell. The inner core is a metal particle. The chemical composition of the inner shell is silicon dioxide. The outer shell is phosphor represented by the following chemical formula: $(R_{1-x}, Eu_x)_2O_3$, wherein R is Y, Gd or a combination thereof, $0.02 \leq x \leq 0.1$.

The double core-shell can be represented by the following chemical formula: $M@SiO_2@(R_{1-x}, Eu_x)_2O_3$, where @ represents coating. It should be noted that, the molar ratio of M, $SiO_2$, and $(R_{1-x}, Eu_x)_2O_3$ is not shown in the formula $M@SiO_2@(R_{1-x}, Eu_x)_2O_3$, instead, the formula only indicates a double core-shell coating structure, i.e. the three elements in the formula represent inner core, inner shell, and outer shell in this order. Similarly, $M@SiO_2$ and $M@SiO_2@(Y_{1-x}, Eu_x)_2(C_2O_4)_3$, which will be described later, have the same structure.

In detail, the metal particle is made of a metal having a good stability to enhance the luminescence of the phosphor. Preferably, the metal particle is made of at least one of Ag, Au, Pt, and Pd. The metal particle is preferably nanoparticle having a particle size in a range of, e.g., 20 nm to 100 nm.

The previously described double core-shell fluorescent material has a double core-shell structure or double shell structure, in other words, it has a double coating structure, namely inner-coating and outer-coating. The inner-coating structure, which is formed by an inner core coated by an inner shell, is a microsphere structure, or a microsphere particle. The size of the microsphere particle may be in magnitude of micron, e.g., 1 μm to 100 μm. The outer-coating structure is formed by an inner shell coated by an outer shell, and is also a microsphere structure, namely the shape of the outer shell is spherical. The outer shell covers the surface of the inner shell in a form of layer, that is the outer shell forms a phosphor layer represented by the chemical formula: $(R_{1-x}, Eu_x)_2O_3$. The whole double core-shell fluorescent material is in a form of particle, preferably spherical particle, or spherical-like particle.

In the previously described double core-shell fluorescent material, the phosphor serves as a luminescence center. R is Y, Gd or a combination of them. During irradiation, $Y^{3+}$ and/or $Gd^{3+}$ serves as active ion, $Eu^{3+}$ serves as a luminescence ion. In detail, when $Y^{3+}$ and/or $Gd^{3+}$ absorbs energy, it can transfer the energy to the adjacent $Eu^{3+}$ ion via a resonance energy transfer process, thus irradiating $Eu^{3+}$ to emit red light.

In the previously described double core-shell fluorescent material, on the one hand, the amount of the phosphor is largely decreased by the double core-shell structure, for example, the amount of the phosphor is much less than that in the conventional single core-shell structure; on the other hand, because the double core-shell structure is monodisperse, which can well disperse the phosphor, the distribution uniformity and stability of fluorescent material particle can be increased, thus resulting in a better uniform and stable luminescence effect of the fluorescent material. In addition, since the metal particle is coated by the phosphor, the fluorescence can be enhanced via a surface plasma resonance produced by the metal particle, such that the double core-shell fluorescent material has a greatly improved emitting performance compared with the conventional fluorescent material, such as $SiO_2@(Y, Eu)_2O_3$. Furthermore, the fluorescent material is spherical, and the size and the morphology can be controlled. The spherical morphology has a high bulk density, thus it is convenient for screen coating process and can improve the display effect.

Referring to FIG. 1, a flowchart of an embodiment of a method for preparing a double core-shell fluorescent material of the present disclosure is shown. The method includes the following steps.

Step S01, a metal particle sol is obtained.

Step S02, a suspension containing $M@SiO_2$ is prepared. The metal particle sol is dissolved into an alcohol solvent and weak alkaline solution, tetraethyl orthosilicate is added to react and a suspension in which silicon dioxide coats a metal particle as an inner shell is prepared.

Step S03, a precursor of the double core-shell fluorescent material is obtained. A mixture solution containing at least one of yttrium nitrate and gadolinium nitrate with europium nitrate is prepared, a precipitant or gel is added, each nitrate salt and the precipitant or gel are dissolved utilizing solvent, and the suspension in which silicon dioxide coats a metal particle as a inner shell is added to obtain a precursor of the double core-shell fluorescent material.

Step S04, the double core-shell fluorescent material is obtained. The precursor of the double core-shell fluorescent material is calcined to form a phosphor outer shell coating the silicon dioxide inner shell and represented by the following chemical formula: $(R_{1-x}, Eu_x)_2O_3$, wherein R is Y, Gd or a combination thereof, $0.02 \leq x \leq 0.1$.

In step S01, the metal particle can be provided directly, for example, purchased commercially, or prepared. When the metal particle is prepared, the preparation method includes the following steps.

1) Suitable metal compound is weighted and dissolved into a solvent to prepare and be diluted to a solution with certain concentration, e.g., $2 \times 10^{-4}$ mol/L~$1 \times 10^{-3}$ mol/L. The metal compound is preferably selected from the group consisting of silver nitrate, chloroauric acid, chloric acid, palladium chloride, and the solvent is preferably water and/or ethanol.

2) One or more promoters are dissolved in the solution of step 1) under magnetic stirring, and the concentration of the promoter in the finally obtained metal nano-particle sol is in a range of $1.5 \times 10^{-4}$ g/ml to $2.1 \times 10^{-3}$ g/ml. The promoter is preferably selected from the group consisting of polyethylene in N-methyl pyrrolidone (PVP), sodium citrate, sixteen alkyl three methyl ammonium bromide, sodium dodecyl sulfate, and sodium dodecyl sulfonate.

3) A corresponding amount of reducing agent is dissolved in a solvent to prepare a reducing solution having a concentration in a range of $1 \times 10^{-3}$ mol/L to $1 \times 10^{-2}$ mol/L. The corresponding amount of reducing agent is calculated approximately in accordance with the stoichiometric amount to reduce the metal compounds. The reducing agent is preferably hydrazine hydrate, ascorbic acid, or sodium borohydride. The solvent is preferably water and/or ethanol.

4) Under magnetic stirring, the reducing solution of step 3) is added to the solution of step 2 in accordance with a molar ratio of the reducing agent to the metal ion of 1.2:1 to 4.8:1. After a reaction of 10 min to 45 min, the metal nano-particle sol is obtained.

5) In order to facilitate the coating of $SiO_2$ on the metal surface, the metal nano-particle sol is surface treated, which includes the following steps. The metal nano-particle sol of step 4) is diluted with deionized water to a concentration of $1×10^{-6}$ mol/L to $5×10^{-2}$ mol/L. A certain volume of the metal nano-particle sol with the above concentration is measured, and surfactant is added with stirring for 3 h to 12 h. The concentration of the surfactant is in a range of 0.001 g/ml to 0.01 g/ml. In one embodiment, the volume of metal nano-particle sol is measured for 0.5 ml to 10 ml, and the amount of the surfactant is 0.01 g to 0.20 g, in which the ratio can be a reference when mixing them in practice. The surfactant is preferably polyvinyl pyrrolidone.

In step S02, the metal nano-particle sol after surface treatment is further diluted to 10 ml to 20 ml. 10 ml to 50 ml of anhydrous ethanol and 1 ml to 9 ml of ammonia are added with stirring. 0.5 ml to 6 ml of tetraethyl orthosilicate (TEOS) is added under magnetic stirring. After stirring for 1 hour to 6 hours at room temperature, a microsphere suspension in which silicon dioxide coats a metal particle as an inner shell can be obtained. Silicon dioxide coating a metal particle as an inner shell is represented by M@$SiO_2$. Anhydrous ethanol can be replaced by other organic solvent, such as propyl alcohol and so on. Ammonia can be replaced by other weak alkaline solution.

The microsphere suspension can be further purified, dispersed and dissolved, or the microsphere suspension can be directly used. The purification step includes: the suspension is centrifugal separated at a rotational speed of 12000 rpm and washed with deionized water or ethanol for three times to remove remaining weak alkaline solution and residual TEOS, such that M@$SiO_2$ microsphere can be obtained. The dispersion and dissolving step includes: the M@$SiO_2$ microsphere of the purification step is dispersed in distilled water using ultrasonic to obtain a purified M@$SiO_2$ microsphere suspension.

In addition, the microsphere suspension is preferably surface treated after or prior to the purification step or the dispersion and dissolving step. In detail, a surface modifier is added to the M@$SiO_2$ microsphere suspension with magnetic stirring, where the volume ratio of the surface modifier to the suspension is in a range of 5:1000 (v/v) to 2:100 (v/v). After the magnetic stirring for 2 h to 4 h, a surface modified M@$SiO_2$ microsphere suspension is obtained. The surface modifier is preferably polyethyleneimine, 3-aminopropyl trimethoxysilane or 3-aminopropyl triethoxysilane.

Step S03 may further includes the following sub-steps.

(1) A metal nitrate solution is selected. The metal source compound can be metal oxide or nitrate. When metal oxides are used, yttrium oxide and/or gadolinium oxide, europium oxide and other rare earth oxide are added to a nitric acid solution (concentrated nitric acid), wetted by deionized water, heated to dissolve to prepare a metal ion mixture solution with a sum concentration of $Y^{3+}$ and/or $Gd^{3+}$, $Eu^{3+}$ ions of 0.1 mol/L to 1 mol/L, in which a molar ratio of yttrium oxide and/or gadolinium oxide to europium oxide is 0.98: 0.02 to 0.9:0.1. When metal nitrates are used, water serves as a solvent, a mixture solution containing $Eu(NO_3)_3$ and $Gd(NO_3)_3$, or $Eu(NO_3)_3$ and $Y(NO_3)_3$ is prepared according to a molar ratio of $Gd(NO_3)_3$ to $Eu(NO_3)_3$, or $Y(NO_3)_3$ to $Eu(NO_3)_3$ is 0.98:0.02 to 0.9:0.1. The sum of concentration of $Y^{3+}$ and/or $Gd^{3+}$ and $Eu^{3+}$ in the mixture solution is in a range of 0.5 mol/L to 2 mol/L.

(2) The precipitant or gel is added to the metal nitrate solution, each nitrate salt and the precipitant or gel is dissolved utilizing solvent, and the suspension in which silicon dioxide coats a metal particle as the inner shell is added to obtain a precursor of the double core-shell fluorescent material.

The step (2) may have two schemes. In the first scheme, the precipitant, such as urea or oxalic acid, are used to precipitate. The first scheme mainly includes the steps of preparing the precipitant, mixing of the precipitant, the M@$SiO_2$ microsphere suspension, and the metal nitrate solution, the formation of the precipitate, etc. In detail, the first scheme includes the following steps. The suspension in which silicon dioxide coats a metal particle as the inner shell is added to the metal nitrate solution, urea or oxalic acid is added and dissolved with deionized water, the pH value is adjusted utilizing ammonia, magnetic stirred, precipitate is generated, filtered, washed, dried, and a white powder represented by the chemical formula M@$SiO_2$@$(Y_{1-x}, Eu_x)_2(C_2O_4)_3$ is obtained, which is the precursor of double core-shell fluorescent material.

In a specific embodiment, the first scheme includes the following steps:

i. The mixture solution containing $Gd(NO_3)_3$ and/or $Y(NO_3)_3$ and $Eu(NO_3)_3$ of step (1) is added into surface modified (or unmodified) M@$SiO_2$ microsphere suspension of step S02, the mixture solution is obtained by stirring for 1 h to 4 h.

ii. Urea or oxalic acid is weighted according to an overdose of 1.2 to 5.0 times and dissolved in the deionized water to prepare a urea or oxalic acid solution with a concentration of 0.5 mol/L to 2 mol/L.

iii. The prepared urea or oxalic acid solution is added in drops to the mixture solution of step i. The adding time is controlled to 30 min to 80 min. After adding in drops, the solution is magnetic stirred for 2 h to 5 h, and the pH value of the reaction system is adjusted to 7 to 10, and continue magnetic stirring for 0.5 h to 1.5 h.

vi. The product of the step iii is washed and filtered by deionized water and ethanol for three times, and the filtered product is dried in a 80° C. to 100° C. oven for 2 h to 4 h, so as to obtain a white powder of M@$SiO_2$@$(Y_{1-x}, Eu_x)_2(C_2O_4)_3$.

Furthermore, in order to increase the thickness of the outer shell, step i to step vi can be repeated for a number of times, in which the M@$SiO_2$ microsphere is replaced by the product of previous step vi.

In another embodiment, the first scheme includes the following steps:

i) Preparation of the precipitant solution: oxalic acid or urea is dissolved in deionized water, heated to dissolve into 0.1 mol/L to 1.5 mol/L oxalic acid or urea solution, and then ammonia is added to adjust the solution pH value to 7 to 10.

ii) Preparation of the precursor of double core-shell fluorescent material (M@$SiO_2$@$(Y_{1-x}, Eu_x)_2(C_2O_4)_3$). The nitrate salt mixed solution is added into the M@$SiO_2$ ethanol solution with stirring. The oxalic acid and ammonia mixture solution with a pH value of 9 is added in drops into the mixture of metal ions and M@$SiO_2$ mixture, in which the amount of the oxalic acid is 1.5 to 5 times of the molar amount of the rare earth ion. The rate of drops is 1 mL/min to 4 mL/min. The temperature of the solution is 20° C. to 75° C. After the adding in drops, the solution is stirred until the reaction is over and a pH value of the solution is between 7 and 9. The solution is aged for 1~24 h, filtered and washed with deionized water at least once, then with ethanol wash at least once, to obtain the white precipitate. The white precipitate is dried in a 50° C.~120° C. oven for 3 h to 15 h to remove the water and obtain white powder of M@SiO$_2$@(Y$_{1-x}$, Eu$_x$)$_2$(C$_2$O$_4$)$_3$. Similarly, in order to increase the thickness of the outer shell, step ii can be repeated for a number of times, in which the M@SiO$_2$ microsphere is replaced by the product of previous step ii.

The second scheme mainly includes the steps of preparing rare earth metal particle sol and gel, and so on. In detail, the second scheme includes the following steps. The nitrate of yttrium and/or gadolinium, europium is dissolved using solvents such as ethanol or water, citric acid is added, and the amount of the citric acid is determined according to the molar ratio of 1.2:1 to 5:1 that the citric acid and the metal ion in the metal particle gel. The solution is stirred, polyethylene glycol is added and the concentration of the polyethylene glycol in the solution is 0.08 g/ml to 0.2 g/ml. The solution is then stirred in a 30° C. to 60° C. water bath for 4 h to 8 h to prepare a phosphor sol. The phosphor sol is added into the M@SiO$_2$ suspension and stirred in a 60° C. to 90° C. water bath for 3 h to 12 h to obtain a gel, which is the precursor of the double core-shell fluorescent material. Citric acid and polyethylene glycol are used as the gel, and the adding order is not limited to the described embodiment.

In a specific embodiment, the second scheme includes the following steps:

a) According to a ratio of ethanol to water of 3:1 to 9:1, ethanol is added to the nitrate mixture of 1), a corresponding amount of citric acid is added to the mixed solution with stirring. The amount of the citric acid is determined according to a molar ratio of the citric acid to the metal ion (Y$^{3+}$ and/or Gd$^{3+}$, Eu$^{3+}$) in the metal particle gel of 1.2:1 to 5:1.

b) PEG (polyethylene glycol) is added into the mixture solution of step a) and a concentration of the PEG in the system is in a range of 0.08 g/mL to 0.2 g/mL. The solution is then stirred and reacted in a 30° C. to 60° C. water bath for 4 h to 8 h to prepare a sol.

c) The M@SiO$_2$ suspension of step S02 is added into the sol of step b), the solution is then stirred in a 60° C. to 90° C. water bath for 3 h to 12 h to obtain a gel.

d) The gel of step c) is dried in an 80° C. to 100° C. oven for 2 h to 4 h.

Similarly, in order to increase the thickness of the outer shell, step c) can be repeated for a number of times, in which the M@SiO$_2$ microsphere in step c) is replaced by the product of previous step d) (i.e. the previous obtained precursor).

In step S04, the precursor of the double core-shell fluorescent material of step S03 is calcined at a temperature of 600° C. to 1400° C. for 1 h to 6 h to obtain the double core-shell fluorescent material of M@SiO$_2$@(Y$_{1-x}$, Eu$_x$)$_2$(C$_2$O$_4$)$_3$. The calcination temperature is preferably 800° C. to 1200° C., the calcination time is preferably 2 h to 3 h. The above scheme is known as the Pechini sol-gel method.

The specific compounds are described to illustrate the double core-shell fluorescent material of different composition and preparation methods, as well as its performance.

Example 1

Under room temperature, 0.5 ml of Au particle sol having average particle size of 20 nm, the concentration of 5×10$^{-2}$ mol/L was measured and placed in a beaker. 0.01 g of PVP was added with stirring. After 3 h of stirring, 20 ml of ethanol, 2 ml of deionized water, 2 ml of ammonia, and 1 ml of TEOS were added in that order. After stirred for 5 h, the solution is centrifuged to obtain Au@SiO$_2$ microsphere particles, which is then washed with ethanol for three times, poured into a conical flask.

2.1226 g of yttria oxide and 0.21111 g of europium oxide were weighted and wetted by deionized water, dissolved by 5 ml of nitric acid to produce a metal nitrate mixed solution, the sum metal ion concentration of which is 0.1 mol/L. The metal nitrate mixed solution was poured into Au@SiO$_2$ ethanol solution and stirred to prepare a mixture solution A.

3.7821 g of oxalic acid was weighted and dissolved in deionized water, ammonia was add to adjust the pH value to 9 and prepare a 0.1 mol/L of a mixed solution of oxalic acid and ammonia. The mixed solution of oxalic acid and ammonia was then added in drops to the mixture solution A by a rate of 2 ml/min. After the dropping, ammonia was added to adjust the pH value to 7, the solution was aged for 12 h and filtered, the precipitation was washed with deionized water and ethanol for three times and then moved into a 60° C. oven to dry for 15 h to obtain a white powder. The white powder is heat treated at 1100° C. for 2 h to obtain a double core-shell phosphor of Au@SiO$_2$@(Y$_{0.94}$, Eu$_{0.06}$)$_2$O$_3$.

Example 2

Under room temperature, 1 ml of Pt particle sol having average particle size of 100 nm, the concentration of 1×10$^{-6}$ mol/L was measured and placed in a beaker. 0.20 g of PVP was added with stirring. After 12 h of stirring, 10 ml of ethanol, 10 ml of deionized water, 1 ml of ammonia, and 1 ml of TEOS were added in that order. After stirred for 3 h, the solution is centrifuged to obtain Pt@SiO$_2$ microsphere particles, which is then washed with ethanol for five times, poured into a conical flask.

2.2558 g of yttria oxide and 0.0035 g of europium oxide were weighted and wetted by deionized water, dissolved by 5 ml of nitric acid to produce a metal nitrate mixed solution, the sum metal ion concentration of which is 0.5 mol/L. The metal nitrate mixed solution was poured into Pt@SiO$_2$ ethanol solution and stirred to prepare a mixture solution A.

4.9167 g of oxalic acid was weighted and dissolved in deionized water, ammonia was add to adjust the pH value to 9 and prepare a 1.5 mol/L of a mixed solution of oxalic acid and ammonia. The mixed solution of oxalic acid and ammonia was then added in drops to the mixture solution A by a rate of 2 ml/min. After the dropping, ammonia was added to adjust the pH value to 9, the solution was aged for 1 h and filtered, the precipitation was washed with deionized water and ethanol for three times and then moved into a 50° C. oven to dry for 15 h to obtain a white powder. The white powder is heat treated at 1400° C. for 1 h to obtain a double core-shell phosphor of Pt@SiO$_2$@(Y$_{0.999}$, Eu$_{0.001}$)$_2$O$_3$.

Example 3

Under room temperature, 2 ml of Ag particle sol having average particle size of 60 nm, the concentration of 3×10$^{-6}$ mol/L was measured and placed in a beaker. 0.15 g of PVP was added with stirring. After 6 h of stirring, 14 ml of ethanol, 8 ml of deionized water, 3 ml of ammonia, and 2 ml of TEOS were added in that order. After stirred for 1 h, the solution is centrifuged to obtain Ag@SiO$_2$ microsphere particles, which is then washed with ethanol for four times, poured into a conical flask.

2.1000 g of yttria oxide and 0.2463 g of europium oxide were weighted and wetted by deionized water, dissolved by 5 ml of nitric acid to produce a metal nitrate mixed solution, the sum metal ion concentration of which is 1 mol/L. The metal nitrate mixed solution was poured into Ag@SiO$_2$ ethanol solution and stirred to prepare a mixture solution A.

6.3035 g of oxalic acid was weighted and dissolved in deionized water, ammonia was add to adjust the pH value to 9 and prepare a 0.5 mol/L of a mixed solution of oxalic acid and ammonia. The mixed solution of oxalic acid and ammonia was then added in drops to the mixture solution A by a rate of 2 ml/min. After the dropping, ammonia was added to adjust the pH value to 10, the solution was aged for 24 h and filtered, the precipitation was washed with deionized water and ethanol for three times and then moved into a 120° C. oven to dry for 3 h to obtain a white powder. The white powder is heat treated at 800° C. for 4 h to obtain a double core-shell phosphor of Ag@SiO$_2$@(Y$_{0.93}$, Eu$_{0.07}$)$_2$O$_3$.

Example 4

Under room temperature, 1 ml of Pd particle sol having average particle size of 80 nm, the concentration of $5\times10^{-3}$ mol/L was measured and placed in a beaker. 0.12 g of PVP was added with stirring. After 10 h of stirring, 16 ml of ethanol, 5 ml of deionized water, 1.5 ml of ammonia, and 0.5 ml of TEOS were added in that order. After stirred for 6 h, the solution is centrifuged to obtain Pd@SiO$_2$ microsphere particles, which is then washed with ethanol for three times, poured into a conical flask.

2.1904 g of yttria oxide and 0.1056 g of europium oxide were weighted and wetted by deionized water, dissolved by 5 ml of nitric acid to produce a metal nitrate mixed solution, the sum metal ion concentration of which is 0.2 mol/L. The metal nitrate mixed solution was poured into Pd@SiO$_2$ ethanol solution and stirred to prepare a mixture solution A.

4.9167 g of oxalic acid was weighted and dissolved in deionized water, ammonia was add to adjust the pH value to 9 and prepare a 0.8 mol/L of a mixed solution of oxalic acid and ammonia. The mixed solution of oxalic acid and ammonia was then added in drops to the mixture solution A by a rate of 2 ml/min. After the dropping, ammonia was added to adjust the pH value to 8, the solution was aged for 12 h and filtered, the precipitation was washed with deionized water and ethanol for three times and then moved into a 90° C. oven to dry for 8 h to obtain a white powder. The white powder is heat treated at 1000° C. for 3 h to obtain a double core-shell phosphor of Pd@SiO$_2$@(Y$_{0.97}$, Eu$_{0.03}$)$_2$O$_3$.

Example 5

Under room temperature, 1 ml of Ag particle sol having average particle size of 80 nm, the concentration of $3\times10^{-5}$ mol/L was measured and placed in a beaker. 0.10 g of PVP was added with stirring. After 6 h of stirring, 15 ml of ethanol, 85 ml of deionized water, 1 ml of ammonia, and 2 ml of TEOS were added in that order. After stirred for 4 h, the solution is centrifuged to obtain Ag@SiO$_2$ microsphere particles, which is then washed with ethanol for three times, poured into a conical flask.

2.1000 g of yttria oxide and 0.2463 g of europium oxide were weighted and wetted by deionized water, dissolved by 5 ml of nitric acid to produce a metal nitrate mixed solution, the sum metal ion concentration of which is 1 mol/L. The metal nitrate mixed solution was poured into Ag@SiO$_2$ ethanol solution and stirred to prepare a mixture solution A.

5.6732 g of oxalic acid was weighted and dissolved in deionized water, ammonia was add to adjust the pH value to 9 and prepare a 1 mol/L of a mixed solution of oxalic acid and ammonia. The mixed solution of oxalic acid and ammonia was then added in drops to the mixture solution A by a rate of 3 ml/min. After the dropping, ammonia was added to adjust the pH value to 8, the solution was aged for 24 h and filtered, the precipitation was washed with deionized water and ethanol for three times and then moved into a 100° C. oven to dry for 5 h to obtain a white powder. The white powder is heat treated at 900° C. for 4 h to obtain a double core-shell phosphor of Ag@SiO$_2$@(Y$_{0.93}$, Eu$_{0.07}$)$_2$O$_3$.

Example 6

Preparation of the Pt nano-particle sol: 5.18 mg of chloroplatinic acid (H$_2$PtCl$_6$.6H2O) was dissolved into 17 ml of deionized water. When the chloroplatinic acid was completely dissolved, 8.0 mg of sodium citrate and 12.0 mg of sodium dodecyl sulfate were weighted and dissolved in the chloroplatinic acid solution with magnetic stirring. 0.38 mg of sodium borohydride was dissolved into 10 ml of deionized water to prepare a 10 ml of sodium borohydride aqueous solution with the concentration of $1\times10^{-3}$ mol/L. 10 ml of hydrazine hydrate solution with the concentration of $1\times10^{-2}$ mol/L was prepared at the same time. Under magnetic stirring, 0.4 ml of sodium borohydride aqueous solution was added in drops into the chloroplatinic acid solution, stirred for 5 min, 2.6 ml of hydrazine hydrate solution with the concentration of $1\times10^{-2}$ mol/L was then added in drops into the chloroplatinic acid aqueous solution, continuing to react for 40 min to prepare 20 ml of Pt nano-particle sol. 6.0 mg of PVP was added into 6 ml of Pt nano-particle sol with magnetic stirring for 12 h to obtain a surface treated Pt nano-particle.

Preparation of Pt@SiO2 microsphere and surface modification: 6 ml of surface treated Pt nano-particle is diluted with deionized water to 10 ml. Followed by adding 15 ml of anhydrous ethanol and 1 ml of ammonia with magnetic stirring. 0.5 ml of TEOS is added in drops under stirring. After the dropping, the mixture was stirred for 2 h to obtain a Pt @SiO$_2$ microsphere suspension. The obtained Pt@SiO$_2$ microsphere suspension was centrifuged by a speed of 12000 rpm, washed three times with deionized water, to remove the remaining ammonia and residual TEOS, to obtain a purified Pt@SiO$_2$ microsphere. The obtained Pt@SiO$_2$ microsphere was dispersed into deionized water via ultrasonic to prepare 10 ml of Pt@SiO$_2$ suspension. In the environment of magnetic stirring, 0.1 ml of surface modifier, polyethylene imine, was added into 10 ml suspension, and then stirred for 2 h to obtain surface modified of Pt@SiO$_2$ microsphere suspension, which is denoted by A1.

Preparation of Pt@SiO$_2$@(Gd$_{0.98}$, Eu$_{0.02}$)$_2$O$_3$. 1.774 g of Gd$_2$O$_3$ and 0.0352 g of Eu$_2$O$_3$ were weighted according to a molar ratio of Gd(NO$_3$)$_3$ to Eu(NO$_3$)$_3$ of 0.98:0.02. Gd$_2$O$_3$ and Eu$_2$O$_3$ were dissolved with concentrated nitric acid to prepare 10 ml of mixture solution containing Gd(NO$_3$)$_3$ and Eu(NO$_3$)$_3$, in which the sum concentration of the Gd$^{3+}$ and Eu$^{3+}$ is 0.5 mol/L. The mixture solution containing Gd(NO$_3$)$_3$ and Eu(NO$_3$)$_3$ was added to the obtained suspension A1, magnetic stirred for 1 h to prepare a mixture solution denoted by B1. 1.5306 g of urea which overdosed for five times was weighted and dissolved in 25.5 ml of deionized water to prepare a urea solution with a concentration of 1 mol/L. The urea solution was added in drops into the mixture solution B1 for 30 min. After the dropping, continue to stir for 2 h, the pH value of the system was adjusted to 7, continue to stir for 1.5 h to prepare a suspension denoted by C1. The suspension C1 was washed and filtered with deionized water and ethanol for three times, and filtration product was dried in an 80° C. oven for 4 h. The coating step was repeated for three times. The finally obtained dried product was calcined at a high temperature of 800° C. for 6 h to obtain a double core-shell fluorescent material of $Pt@SiO_2@(Gd_{0.98}, Eu_{0.02})_2O_3$.

Example 7

Preparation of the Au nano-particle sol: 4.12 mg of chloroauric acid ($H_2AuCl_6.6H2O$) was dissolved into 8.4 ml of deionized water. When the chloroauric acid was completely dissolved, 14 mg of sodium citrate and 6 mg of cetyl trimethyl ammonium bromide were weighted and dissolved in the chloroauric acid solution with magnetic stiffing. 1.9 mg of sodium borohydride and 17.6 mg of ascorbic acid were dissolved into 10 ml of deionized water respectively to prepare 10 ml of sodium borohydride aqueous solution with the concentration of $5\times10^{-3}$ mol/L and 10 ml of ascorbic acid aqueous solution with the concentration of $1\times10^{-2}$ mol/L. Under magnetic stirring, 0.04 ml of sodium borohydride aqueous solution was added in drops into the chloroauric acid solution, stirred for 5 min, 1.56 ml of ascorbic acid aqueous solution with the concentration of $1\times10^{-2}$ mol/L was then added in drops into the chloroauric acid aqueous solution, continuing to react for 30 min to prepare 10 ml of Au nano-particle sol with a concentration of $1\times10^{-3}$ mol/L. 10 mg of PVP was added into 6 ml of Au nano-particle sol with magnetic stirring for 8 h to obtain a surface treated Au nano-particle.

Preparation of Au@SiO2 microsphere and surface modification: 6 ml of surface treated Au nano-particle is diluted with deionized water to 10 ml. Followed by adding 25 ml of anhydrous ethanol and 4 ml of ammonia with magnetic stirring. 1 ml of TEOS is added in drops under stirring. After the dropping, the mixture was stirred for 3 h to obtain an $Au@SiO_2$ microsphere suspension. The obtained $Au@SiO_2$ microsphere suspension was centrifuged by a speed of 12000 rpm, washed three times with deionized water, to remove the remaining ammonia and residual TEOS, to obtain a purified $Au@SiO_2$ microsphere. The obtained $Au@SiO_2$ microsphere was dispersed into deionized water via ultrasonic to prepare 10 ml of $Au@SiO_2$ suspension. In the environment of magnetic stirring, 0.2 ml of surface modifier, 3-aminopropyl trimethoxysilane, was added into 10 ml suspension, and then stirred for 2 h to obtain surface modified of $Au@SiO_2$ microsphere suspension, which is denoted by A2.

Preparation of $Au@SiO_2@(Gd_{0.95}, Eu_{0.05})_2O_3$. 3.620 g of $Gd_2O_3$ and 0.1853 g of $Eu_2O_3$ were weighted according to a molar ratio of $Gd(NO_3)_3$ to $Eu(NO_3)_3$ of 0.95:0.05. $Gd_2O_3$ and $Eu_2O_3$ were dissolved with concentrated nitric acid to prepare 20 ml of mixture solution containing $Gd(NO_3)_3$ and $Eu(NO_3)_3$, in which the sum concentration of the $Gd^{3+}$ and $Eu^{3+}$ is 0.53 mol/L. The mixture solution containing $Gd(NO_3)_3$ and $Eu(NO_3)_3$ was added to the obtained suspension A2, magnetic stirred for 2 h to prepare a mixture solution denoted by B2. 2.3874 g of oxalic acid which overdosed for 1.2 times was weighted and dissolved in 18.9 ml of deionized water to prepare an oxalic acid solution with a concentration of 1 mol/L. The oxalic acid solution was added in drops into the mixture solution B2 for 40 min. After the dropping, continue to stir for 3 h, the pH value of the system was adjusted to 9, continue to stir for 1 h to prepare a suspension denoted by C2. The suspension C2 was washed and filtered with deionized water and ethanol for three times, and filtration product was dried in a 100° C. oven for 2 h. The finally obtained dried product was calcined at a high temperature of 1000° C. for 4 h to obtain a double core-shell fluorescent material of $Au@SiO_2@(Gd_{0.95}, Eu_{0.05})_2O_3$.

Example 8

Preparation of the Ag nano-particle sol: 3.40 mg of silver nitrate ($AgNO_3$) was dissolved into 18.4 ml of deionized water. When the silver nitrate was completely dissolved, 42 mg of sodium citrate was weighted and dissolved in the silver nitrate solution with magnetic stirring. 5.7 mg of sodium borohydride was dissolved into 10 mL deionized water to obtain 10 ml sodium borohydride aqueous solution with a concentration of $1.5\times10^{-2}$ mol/L. Under magnetic stirring, 1.6 ml of sodium borohydride aqueous solution with a concentration of $1.5\times10^{-2}$ mol/L was added to the silver nitrate, continuing to react for 10 min to prepare 20 ml of Ag nano-particle sol with a concentration of $1\times10^{-3}$ mol/L. 40 mg of PVP was added into 8 ml of Ag nano-particle sol with magnetic stirring for 6 h to obtain a surface treated Ag nano-particle.

Preparation of Ag@SiO2 microsphere and surface modification: 8 ml of surface treated Ag nano-particle is diluted with deionized water to 10 ml. Followed by adding 30 ml of anhydrous ethanol and 6 ml of ammonia with magnetic stirring. 2 ml of TEOS is added in drops under stirring. After the dropping, the mixture was stirred for 3 h to obtain an $Ag@SiO_2$ microsphere suspension. The obtained $Au@SiO_2$ microsphere suspension was centrifuged by a speed of 12000 rpm, washed three times with deionized water, to remove the remaining ammonia and residual TEOS, to obtain a purified $Ag@SiO_2$ microsphere. The obtained $Ag@SiO_2$ microsphere was dispersed into deionized water via ultrasonic to prepare 20 ml of $Ag@SiO_2$ suspension. In the environment of magnetic stirring, 0.2 ml of surface modifier, polyethylenimine, was added into 20 ml of $Ag@SiO_2$ suspension, and then stirred for 3 h to obtain surface modified of $Ag@SiO_2$ microsphere suspension, which is denoted by A3.

Preparation of $Ag@SiO_2@(Gd_{0.94}, Eu_{0.06})_2O_3$. 4.344 g of $Gd_2O_3$ and 0.2996 g of $Eu_2O_3$ were weighted according to a molar ratio of $Gd(NO_3)_3$ to $Eu(NO_3)_3$ of 0.94:0.06. $Gd_2O_3$ and $Eu_2O_3$ were dissolved with concentrated nitric acid to prepare 20 ml of mixture solution containing $Gd(NO_3)_3$ and $Eu(NO_3)_3$, in which the sum concentration of the $Gd^{3+}$ and $Eu^{3+}$ is 0.638 mol/L. The mixture solution containing $Gd(NO_3)_3$ and $Eu(NO_3)_3$ was added to the obtained suspension A3, magnetic stirred for 2 h to prepare a mixture solution denoted by B3. 3.150 g of oxalic acid which overdosed for 1.3 times was weighted and dissolved in 50 ml of deionized water to prepare an oxalic acid solution with a concentration of 0.5 mol/L. The oxalic acid solution was added in drops into the mixture solution B3 for 60 min. After the dropping, continue to stir for 3 h, the pH value of the system was adjusted to 9, continue to stir for 1 h to prepare a suspension denoted by C3. The suspension C3 was washed and filtered with deionized water and ethanol for three times, and filtration product was dried in a 90° C. oven for 3 h. The finally obtained dried product was calcined at a high temperature of 1000° C. for 4 h to obtain a double core-shell fluorescent material of $Ag@SiO_2@(Gd_{0.94}, Eu_{0.06})_2O_3$.

Example 9

Preparation of the Pd nano-particle sol: 0.43 mg of palladium chloride ($PdCl_2.2H_2O$) was dissolved into 8.5 ml of deionized water. When the palladium chloride was completely dissolved, 11.0 mg of sodium citrate and 4.0 mg of sodium dodecyl sulfate were weighted and dissolved in the palladium chloride solution with magnetic stirring. 3.8 mg of sodium borohydride was dissolved into 10 mL deionized water to obtain 10 ml sodium borohydride aqueous solution with a concentration of $1\times10^{-2}$ mol/L. Under magnetic stirring, 0.48 ml of sodium borohydride aqueous solution with a concentration of $1\times10^{-2}$ mol/L was added to the palladium chloride aqueous solution, continuing to react for 20 min to prepare 10 ml of Pd nano-particle sol with a concentration of $1\times10^{-4}$ mol/L. 50 mg of PVP was added into 10 ml of Pd nano-particle sol with magnetic stirring for 4 h to obtain a surface treated Pd nano-particle.

Preparation of Pd@SiO$_2$ microsphere and surface modification: 10 ml of surface treated Pd nano-particle was diluted with deionized water to 15 ml. Followed by adding 40 ml of anhydrous ethanol and 7 ml of ammonia with magnetic stirring. 4 ml of TEOS is added in drops under stirring. After the dropping, the mixture was stirred for 4 h to obtain a Pd@SiO$_2$ microsphere suspension. The obtained Pd@SiO$_2$ microsphere suspension was centrifuged by a speed of 12000 rpm, washed three times with deionized water, to remove the remaining ammonia and residual TEOS, to obtain a purified Pd@SiO$_2$ microsphere. The obtained Pd@SiO$_2$ microsphere was dispersed into deionized water via ultrasonic to prepare 30 ml of Pd@SiO$_2$ suspension. In the environment of magnetic stirring, 0.4 ml of surface modifier, 3-aminopropyl triethoxysilane, was added into 30 ml of Pd@SiO$_2$ suspension, and then stirred for 2 h to obtain surface modified of Pd@SiO$_2$ microsphere suspension, which is denoted by A4.

Preparation of Pd@SiO$_2$@(Gd$_{0.92}$, Eu$_{0.08}$)$_2$O$_3$. 7.240 g of Gd$_2$O$_3$ and 0.6121 g of Eu$_2$O$_3$ were weighted according to a molar ratio of Gd(NO$_3$)$_3$ to Eu(NO$_3$)$_3$ of 0.92:0.08. Gd$_2$O$_3$ and Eu$_2$O$_3$ were dissolved with concentrated nitric acid to prepare 21.7 ml of mixture solution containing Gd(NO$_3$)$_3$ and Eu(NO$_3$)$_3$, in which the sum concentration of the Gd$^{3+}$ and Eu$^{3+}$ is 1 mol/L. The mixture solution containing Gd(NO$_3$)$_3$ and Eu(NO$_3$)$_3$ was added to the obtained suspension A4, magnetic stirred for 3 h to prepare a mixture solution denoted by B4. 5.752 g of oxalic acid which overdosed for 1.4 times was weighted and dissolved in 25 ml of deionized water to prepare an oxalic acid solution with a concentration of 1.83 mol/L. The oxalic acid solution was added in drops into the mixture solution B4 for 70 min. After the dropping, continue to stir for 4 h, the pH value of the system was adjusted to 11, continue to stir for 0.5 h to prepare a suspension denoted by C4. The suspension C4 was washed and filtered with deionized water and ethanol for three times, and filtration product was dried in a 100° C. oven for 2 h. The finally obtained dried product was calcined at a high temperature of 1100° C. for 3 h to obtain a double core-shell fluorescent material of Pd@SiO$_2$@(Gd$_{0.92}$, Eu$_{0.08}$)$_2$O$_3$.

Example 10

Preparation of the Ag nano-particle sol: 3.40 mg of silver nitrate (AgNO$_3$) was dissolved into 18.4 ml of ethanol. When the silver nitrate was completely dissolved, 35.5 mg of PVP was weighted and dissolved in the silver nitrate ethanol solution with magnetic stirring. 5.7 mg of sodium borohydride was dissolved into 10 ml ethanol to obtain 10 ml sodium borohydride ethanol solution with a concentration of $1.5\times10^{-2}$ mol/L. Under magnetic stirring, 1.6 ml of sodium borohydride ethanol solution with a concentration of $1.5\times10^{-2}$ mol/L was added to the silver nitrate ethanol solution, continuing to react for 15 min to prepare 20 ml of Ag nano-particle sol with a concentration of $1\times10^{-3}$ mol/L. 100 mg of PVP was added into 10 ml of Ag nano-particle sol with magnetic stirring for 3 h to obtain a surface treated Ag nano-particle.

Preparation of Ag@SiO$_2$ microsphere and surface modification: 10 ml of surface treated Ag nano-particle is diluted with deionized water to 20 ml. Followed by adding 50 ml of anhydrous ethanol and 9 ml of ammonia with magnetic stirring. 6 ml of TEOS is added in drops under stirring. After the dropping, the mixture was stirred for 6 h to obtain an Ag@SiO$_2$ microsphere suspension. The obtained Au @SiO$_2$ microsphere suspension was centrifuged by a speed of 12000 rpm, washed three times with deionized water, to remove the remaining ammonia and residual TEOS, to obtain a purified Ag@SiO$_2$ microsphere. The obtained Ag@SiO$_2$ microsphere was dispersed into deionized water via ultrasonic to prepare 40 ml of Ag@SiO$_2$ suspension. In the environment of magnetic stirring, 0.2 ml of surface modifier, 3-aminopropyl triethoxysilane, was added into 40 ml of Ag@SiO$_2$ suspension, and then stirred for 4 h to obtain surface modified of Ag@SiO$_2$ microsphere suspension, which is denoted by A5.

Preparation of Ag@SiO$_2$@(Gd$_{0.90}$, Eu$_{0.1}$)$_2$O$_3$. 9.774 g of Gd$_2$O$_3$ and 1.056 g of Eu$_2$O$_3$ were weighted according to a molar ratio of Gd(NO$_3$)$_3$ to Eu(NO$_3$)$_3$ of 0.90:0.10. Gd$_2$O$_3$ and Eu$_2$O$_3$ were dissolved with concentrated nitric acid to prepare 15 ml of mixture solution containing Gd(NO$_3$)$_3$ and Eu(NO$_3$)$_3$, in which the sum concentration of the Gd$^{3+}$ and Eu$^{3+}$ is 2 mol/L. The mixture solution containing Gd(NO$_3$)$_3$ and Eu(NO$_3$)$_3$ was added to the obtained suspension A5, magnetic stirred for 4 h to prepare a mixture solution denoted by B5. 8.505 g of oxalic acid which overdosed for 1.5 times was weighted and dissolved in 34 ml of deionized water to prepare an oxalic acid solution with a concentration of 2 mol/L. The oxalic acid solution B5 was added in drops into the mixture solution B5 for 80 min. After the dropping, continue to stir for 5 h, the pH value of the system was adjusted to 12, continue to stir for 0.5 h to prepare a suspension denoted by C5. The suspension C5 was washed and filtered with deionized water and ethanol for three times, and filtration product was dried in a 100° C. oven for 3 h. The finally obtained dried product was calcined at a high temperature of 1200° C. for 2 h to obtain a double core-shell fluorescent material of Ag@SiO$_2$@(Gd$_{0.90}$, Eu$_{0.10}$)$_2$O$_3$.

Example 11

Preparation of the Pt nano-particle sol: 5.18 mg of chloroplatinic acid (H$_2$PtCl$_6$.6H2O) was dissolved into 17 ml of deionized water. When the chloroplatinic acid was completely dissolved, 8.0 mg of sodium citrate and 12.0 mg of sodium dodecyl sulfate were weighted and dissolved in the chloroplatinic acid solution with magnetic stirring. 0.38 mg of sodium borohydride was dissolved into 10 ml of deionized water to prepare a 10 ml of sodium borohydride aqueous solution with the concentration of $1\times10^{-3}$ mol/L. 10 ml of hydrazine hydrate solution with the concentration of $1\times10^{-2}$ mol/L was prepared at the same time. Under magnetic stirring, 0.4 ml of sodium borohydride aqueous solution was added in drops into the chloroplatinic acid solution, stirred for 5 min, 2.6 ml of hydrazine hydrate solution with the concentration of $1\times10^{-2}$ mol/L was then added in drops into the chloroplatinic acid aqueous solution, continuing to react for 40 min to prepare 20 ml of Pt nano-particle sol with a concentration of $5\times10^{-4}$ mol/L. 6.0 mg of PVP was added into Pt nano-particle sol with magnetic stirring for 12 h to obtain a surface treated Pt nano-particle.

Preparation of Pt@SiO2 microsphere and surface modification: 6 ml of surface treated Pt nano-particle is diluted with deionized water to 10 ml. Followed by adding 15 ml of anhydrous ethanol and 1 ml of ammonia with magnetic stirring. 0.5 ml of TEOS is added in drops under stirring. After the dropping, the mixture was stirred for 2 h to obtain a Pt@SiO$_2$ microsphere suspension. The obtained Pt@SiO$_2$ microsphere suspension was centrifuged by a speed of 12000 rpm, washed three times with deionized water, to remove the remaining ammonia and residual TEOS, to obtain a purified Pt@SiO$_2$ microsphere. The obtained Pt@SiO$_2$ microsphere was dispersed into deionized water via ultrasonic to prepare 10 ml of Pt@SiO$_2$ suspension.

Preparation of Pt@SiO$_2$@(Gd$_{0.98}$, Eu$_{0.02}$)$_2$O$_3$. 1.774 g of Gd$_2$O$_3$ and 0.0352 g of Eu$_2$O$_3$ were weighted according to a molar ratio of Gd(NO$_3$)$_3$ to Eu(NO$_3$)$_3$ of 0.98:0.02. Gd$_2$O$_3$ and Eu$_2$O$_3$ were dissolved with concentrated nitric acid to prepare 10 ml of mixture solution containing Gd(NO$_3$)$_3$ and Eu(NO$_3$)$_3$, in which the sum concentration of the Gd$^{3+}$ and Eu$^{3+}$ is 0.5 mol/L. 90 ml of ethanol and 4.80 g citric acid were add into nitrate mixture solution, after stirring, 10 g of PEG was added, the solution was stirred in a 30° C. of water bath for 8 h in form a sol. The prepared Pt@SiO$_2$ suspension was added into the sol, the solution was stirred in a 60° C. of water bath for 12 h to form a gel. The gel was dried in an 80° C. oven for 4 h. The dried product was heat treated at a temperature of 600° C. for 6 h, repeating the process for 3 times to obtain a double core-shell fluorescent material of Pt@SiO$_2$@(Gd$_{0.98}$, Eu$_{0.02}$)$_2$O$_3$.

Example 12

Preparation of the Au nano-particle sol: 4.12 mg of chloroauric acid (H$_2$AuCl$_6$.6H2O) was dissolved into 8.4 ml of deionized water. When the chloroauric acid was completely dissolved, 14 mg of sodium citrate and 6 mg of cetyl trimethyl ammonium bromide were weighted and dissolved in the chloroauric acid solution with magnetic stirring. 1.9 mg of sodium borohydride and 17.6 mg of ascorbic acid were dissolved into 10 ml of deionized water respectively to prepare 10 ml of sodium borohydride aqueous solution with the concentration of 5×10$^{-3}$ mol/L and 10 ml of ascorbic acid aqueous solution with the concentration of 1×10$^{-2}$ mol/L. Under magnetic stirring, 0.04 ml of sodium borohydride aqueous solution was added in drops into the chloroauric acid solution, stirred for 5 min, 1.56 ml of ascorbic acid aqueous solution with the concentration of 1×10$^{-2}$ mol/L was then added in drops into the chloroauric acid aqueous solution, continuing to react for 30 min to prepare 10 ml of Au nano-particle sol with a concentration of 1×10$^{-3}$ mol/L. 10 mg of PVP was added into 6 ml of Au nano-particle sol with magnetic stirring for 8 h to obtain a surface treated Au nano-particle.

Preparation of Au@SiO2 microsphere and surface modification: 6 ml of surface treated Au nano-particle is diluted with deionized water to 10 ml. Followed by adding 25 ml of anhydrous ethanol and 2 ml of ammonia with magnetic stirring. 1 ml of TEOS is added in drops under stirring. After the dropping, the mixture was stirred for 3 h to obtain an Au@SiO$_2$ microsphere suspension. The obtained Au@SiO$_2$ microsphere suspension was centrifuged by a speed of 12000 rpm, washed three times with deionized water, to remove the remaining ammonia and residual TEOS, to obtain a purified Au@SiO$_2$ microsphere. The obtained Au@SiO$_2$ microsphere was dispersed into deionized water via ultrasonic to prepare 10 ml of Au@SiO$_2$ suspension.

Preparation of Au@SiO$_2$@(Gd$_{0.95}$, Eu$_{0.05}$)$_2$O$_3$. 3.620 g of Gd$_2$O$_3$ and 0.1853 g of Eu$_2$O$_3$ were weighted according to a molar ratio of Gd(NO$_3$)$_3$ to Eu(NO$_3$)$_3$ of 0.95:0.05. Gd$_2$O$_3$ and Eu$_2$O$_3$ were dissolved with concentrated nitric acid to prepare 15 ml of mixture solution containing Gd(NO$_3$)$_3$ and Eu(NO$_3$)$_3$, in which the sum concentration of the Gd$^{3+}$ and Eu$^{3+}$ is 0.71 mol/L. 85 ml of ethanol and 4.09 g citric acid were add into nitrate mixture solution, after stirring, 8 g of PEG was added, the solution was stirred in a 40° C. of water bath for 6 h in form a sol. The prepared Au@SiO$_2$ suspension was added into the sol, the solution was stirred in a 70° C. of water bath for 8 h to form a gel. The gel was dried in a 90° C. oven for 3 h. The dried product was heat treated at a temperature of 800° C. for 5 h, repeating the process for 3 times to obtain a double core-shell fluorescent material of Au@SiO$_2$@(Gd$_{0.95}$, Eu$_{0.05}$)$_2$O$_3$.

Example 13

Preparation of the Ag nano-particle sol: 3.40 mg of silver nitrate (AgNO$_3$) was dissolved into 18.4 ml of ethanol. When the silver nitrate was completely dissolved, 42 mg of sodium citrate was weighted and dissolved in the silver nitrate ethanol solution with magnetic stirring. 5.7 mg of sodium borohydride was dissolved into 10 ml ethanol to obtain 10 ml sodium borohydride ethanol solution with a concentration of 1.5×10$^{-2}$ mol/L. Under magnetic stirring, 1.6 ml of sodium borohydride ethanol solution with a concentration of 1.5×10$^{-2}$ mol/L was added to the silver nitrate ethanol solution, continuing to react for 15 min to prepare 20 ml of Ag nano-particle sol with a concentration of 1×10$^{-3}$ mol/L. 40 mg of PVP was added into 8 ml of Ag nano-particle sol with magnetic stirring for 6 h to obtain a surface treated Ag nano-particle.

Preparation of Ag@SiO$_2$ microsphere and surface modification: 8 ml of surface treated Ag nano-particle is diluted with deionized water to 10 ml. Followed by adding 30 ml of anhydrous ethanol and 4 ml of ammonia with magnetic stirring. 1.5 ml of TEOS is added in drops under stirring. After the dropping, the mixture was stirred for 3 h to obtain an Ag@SiO$_2$ microsphere suspension. The obtained Au@SiO$_2$ microsphere suspension was centrifuged by a speed of 12000 rpm, washed three times with deionized water, to remove the remaining ammonia and residual TEOS, to obtain a purified Ag@SiO$_2$ microsphere. The obtained Ag@SiO$_2$ microsphere was dispersed into deionized water via ultrasonic to prepare 15 ml of Ag@SiO$_2$ suspension.

Preparation of Ag@SiO$_2$@(Gd$_{0.94}$, Eu$_{0.06}$)$_2$O$_3$. 2.748 g of Gd$_2$O$_3$ and 0.2253 g of Eu$_2$O$_3$ were weighted according to a molar ratio of Gd(NO$_3$)$_3$ to Eu(NO$_3$)$_3$ of 0.94:0.06. Gd$_2$O$_3$ and Eu$_2$O$_3$ were dissolved with concentrated nitric acid to prepare 20 ml of mixture solution containing Gd(NO$_3$)$_3$ and Eu(NO$_3$)$_3$, in which the sum concentration of the Gd$^{3+}$ and Eu$^{3+}$ is 1.28 mol/L. 60 ml of ethanol and 9.84 g citric acid were add into nitrate mixture solution, after stirring, 6 g of PEG was added, the solution was stirred in a 50° C. of water bath for 5 h in form a sol. The prepared Ag@SiO$_2$ suspension was added into the sol, the solution was stirred in an 80° C. of water bath for 5 h to form a gel. The gel was dried in a 90° C. oven for 3 h. The dried product was heat treated at a temperature of 900° C. for 4 h to obtain a double core-shell fluorescent material of Ag@SiO$_2$@(Gd$_{0.94}$, Eu$_{0.06}$)$_2$O$_3$.

Example 14

Preparation of the Pd nano-particle sol: 0.43 mg of palladium chloride (PdCl$_2$.2H$_2$O) was dissolved into 8.5 ml of deionized water. When the palladium chloride was completely dissolved, 35.0 mg of PVP was weighted and dissolved in the palladium chloride aqueous solution. 3.8 mg of sodium borohydride was dissolved into 10 mL deionized water to obtain 10 ml sodium borohydride aqueous solution with a concentration of 1×10$^{-2}$ mol/L. Under magnetic stirring, 0.48 ml of sodium borohydride aqueous solution with a concentration of 1×10$^{-2}$ mol/L was added to the palladium chloride aqueous solution, continuing to react for 20 min to prepare 10 ml of Pd nano-particle sol with a concentration of 1×10$^{-4}$ mol/L. 100 mg of PVP was added into 10 ml of Pd nano-particle sol with magnetic stirring for 4 h to obtain a surface treated Pd nano-particle.

Preparation of Pd@SiO$_2$ microsphere and surface modification: 10 ml of surface treated Pd nano-particle was diluted with deionized water to 20 ml. Followed by adding 50 ml of anhydrous ethanol and 7 ml of ammonia with magnetic stirring. 3 ml of TEOS is added in drops under stirring. After the dropping, the mixture was stirred for 6 h to obtain a Pd@SiO$_2$ microsphere suspension. The obtained Pd@SiO$_2$ microsphere suspension was centrifuged by a speed of 12000 rpm, washed three times with deionized water, to remove the remaining ammonia and residual TEOS, to obtain a purified Pd@SiO$_2$ microsphere. The obtained Pd@SiO$_2$ microsphere was dispersed into deionized water via ultrasonic to prepare 20 ml of Pd@SiO$_2$ suspension.

Preparation of Pd@SiO$_2$@(Gd$_{0.90}$, Eu$_{0.10}$)$_2$O$_3$. 6.102 g of Gd$_2$O$_3$ and 1.056 g of Eu$_2$O$_3$ were weighted according to a molar ratio of Gd(NO$_3$)$_3$ to Eu(NO$_3$)$_3$ of 0.90:0.10. Gd$_2$O$_3$ and Eu$_2$O$_3$ were dissolved with concentrated nitric acid to prepare 15 ml of mixture solution containing Gd(NO$_3$)$_3$ and Eu(NO$_3$)$_3$, in which the sum concentration of the Gd$^{3+}$ and Eu$^{3+}$ is 2 mol/L. 45 ml of ethanol and 6.92 g citric acid were add into nitrate mixture solution, after stirring, 12 g of PEG was added, the solution was stirred in a 60° C. of water bath for 4 h in form a sol. The prepared Pd@SiO$_2$ suspension was added into the sol, the solution was stirred in a 90° C. of water bath for 3 h to form a gel. The gel was dried in a 100° C. oven for 2 h. The dried product was heat treated at a temperature of 1000° C. for 2 h to obtain a double core-shell fluorescent material of Ag@SiO$_2$@(Gd$_{0.90}$, Eu$_{0.10}$)$_2$O$_3$.

Figure 2:
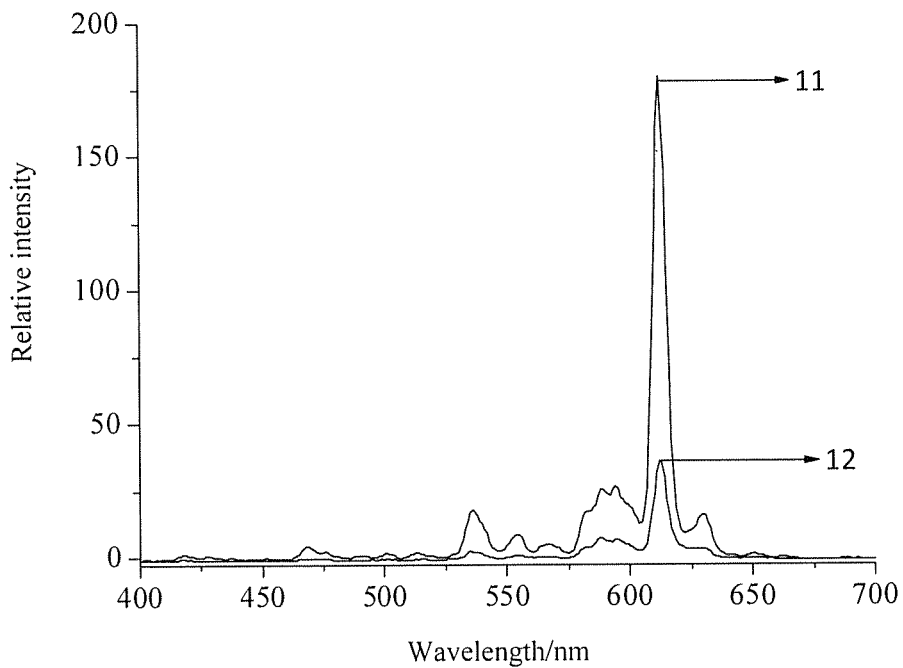
FIG. 2 shows an emission spectrum of the fluorescent material according to example 1 comparing with a conventional fluorescent material.

FIG. 2 shows an emission spectrum of the Au@SiO$_2$@(Gd$_{0.94}$, Eu$_{0.06}$)$_2$O$_3$ (11) according to example 1 comparing with a conventional SiO$_2$@(Gd$_{0.94}$, Eu$_{0.06}$)$_2$O$_3$ (12). As shown in FIG. 2, the integral area of luminescence spectra 11 is 11.59 times of that of the luminescence spectra 12, which shows that the dual core-shell fluorescent materials of Example 1 greatly enhance the luminous intensity by the core metal gold particles. In addition, the peak position of the luminescence spectra 11 and 12 are substantially the same and between 600 nm to 650 nm, which means it irradiates red light.

Figure 3:
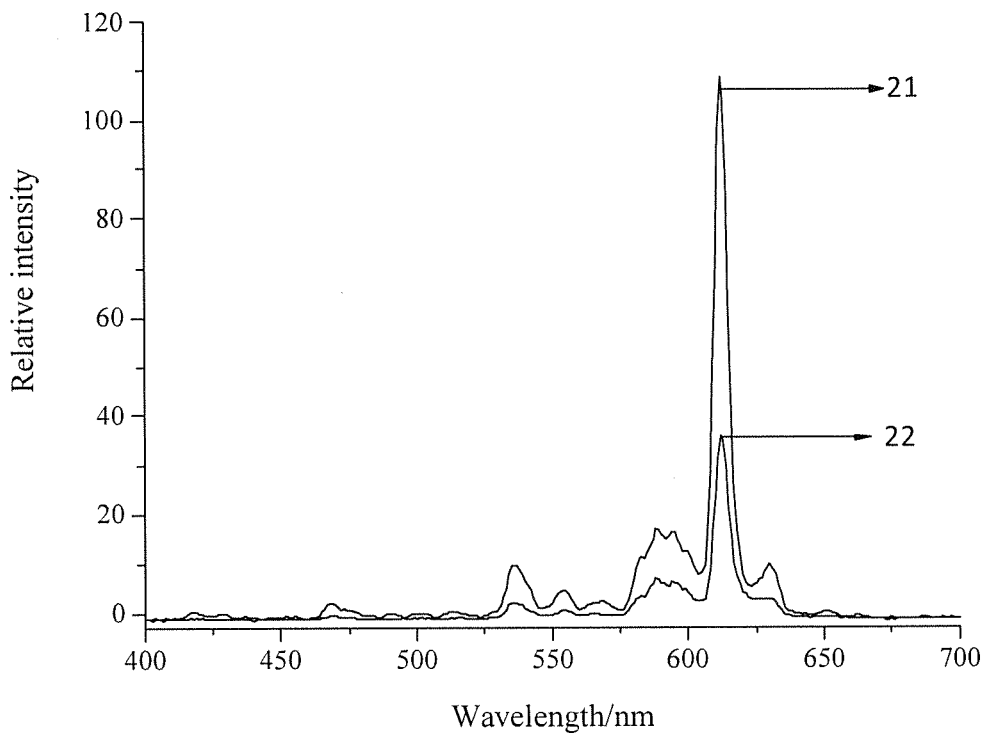
FIG. 3 shows an emission spectrum of the fluorescent material according to example 2 comparing with a conventional fluorescent material.

FIG. 3 shows an emission spectrum of the Pt@SiO$_2$@(Gd$_{0.999}$, Eu$_{0.001}$)$_2$O$_3$ (21) according to example 2 comparing with a conventional SiO$_2$@(Gd$_{0.999}$, Eu$_{0.001}$)$_2$O$_3$ (22). As shown in FIG. 3, the integral area of luminescence spectra 21 is 6.47 times of that of the luminescence spectra 22, which shows that the dual core-shell fluorescent materials of Example 2 greatly enhance the luminous intensity by the core metal Pt particles.

Figure 4:
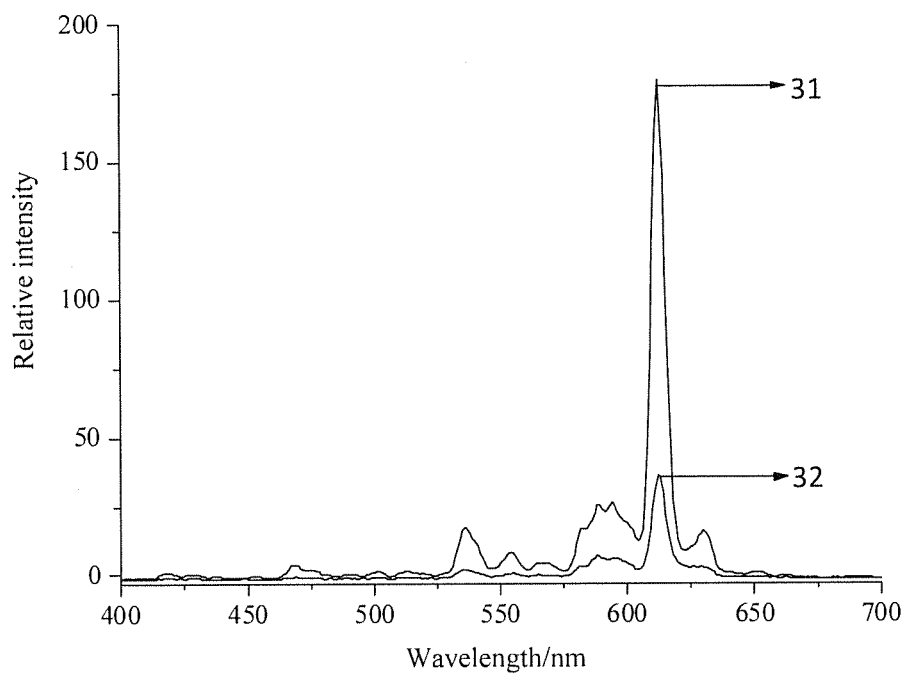
FIG. 4 shows an emission spectrum of the fluorescent material according to example 3 comparing with a conventional fluorescent material.

FIG. 4 shows an emission spectrum of the Ag@SiO$_2$@(Gd$_{0.93}$, Eu$_{0.07}$)$_2$O$_3$ (31) according to example 3 comparing with a conventional SiO$_2$@(Gd$_{0.999}$, Eu$_{0.001}$)$_2$O$_3$ (32). As shown in FIG. 4, the integral area of luminescence spectra 31 is 5.44 times of that of the luminescence spectra 32, which shows that the dual core-shell fluorescent materials of Example 2 greatly enhance the luminous intensity by the core metal Ag particles.

Figure 5:
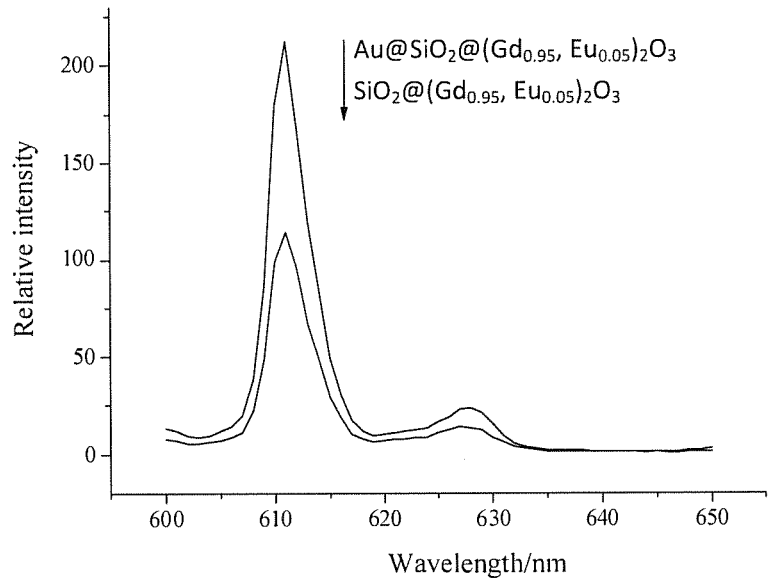
FIG. 5 shows a photoluminescence spectrum of the fluorescent material according to example 7 comparing with a conventional fluorescent material.

FIG. 5 shows a photoluminescence spectrum of the Au@SiO$_2$@(Gd$_{0.95}$, Eu$_{0.05}$)$_2$O$_3$ according to example 7 comparing with a conventional SiO$_2$@(Gd$_{0.95}$, Eu$_{0.05}$)$_2$O$_3$. The luminescence spectrums are arranged in an order according the arrow, in other words, the higher luminescence spectrum represents Au@SiO$_2$@(Gd$_{0.95}$, Eu$_{0.05}$)$_2$O$_3$, and the lower luminescence spectrum represents SiO$_2$@(Gd$_{0.95}$, Eu$_{0.05}$)$_2$O$_3$. As shown in FIG. 5, the integral area of luminescence spectra of Example 7 is 1.73 times of that of the conventional fluorescent material, which shows that, under a light-induced condition, the dual core-shell fluorescent materials greatly enhance the luminous intensity by the core metal gold particles, thus facilitating the application in the product such as photoluminescence device.

Figure 6:
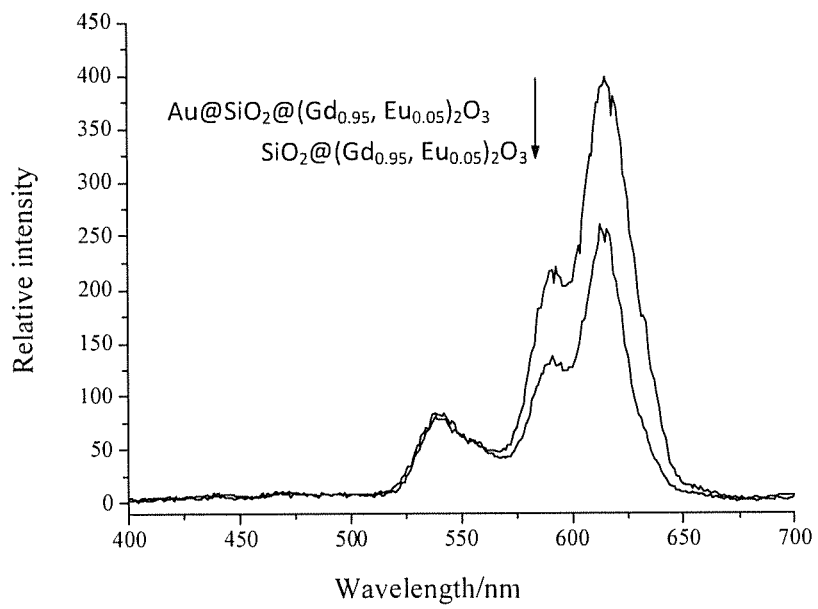
FIG. 6 shows a cathode ray luminescence spectrum of the fluorescent material according to example 7 comparing with a conventional fluorescent material.

FIG. 6 shows a cathode ray luminescence spectrum of the Au@SiO$_2$@(Gd$_{0.95}$, Eu$_{0.05}$)$_2$O$_3$ according to example 7 comparing with a conventional SiO$_2$@(Gd$_{0.95}$, Eu$_{0.05}$)$_2$O$_3$. As shown in FIG. 6, the integral area of luminescence spectra of Example 7 is 1.56 times of that of the conventional fluorescent material, which shows that, under a cathode ray excited condition, the dual core-shell fluorescent materials greatly enhance the luminous intensity by the core metal gold particles, thus facilitating the application in the product such as field emission devices device.

Figure 7:
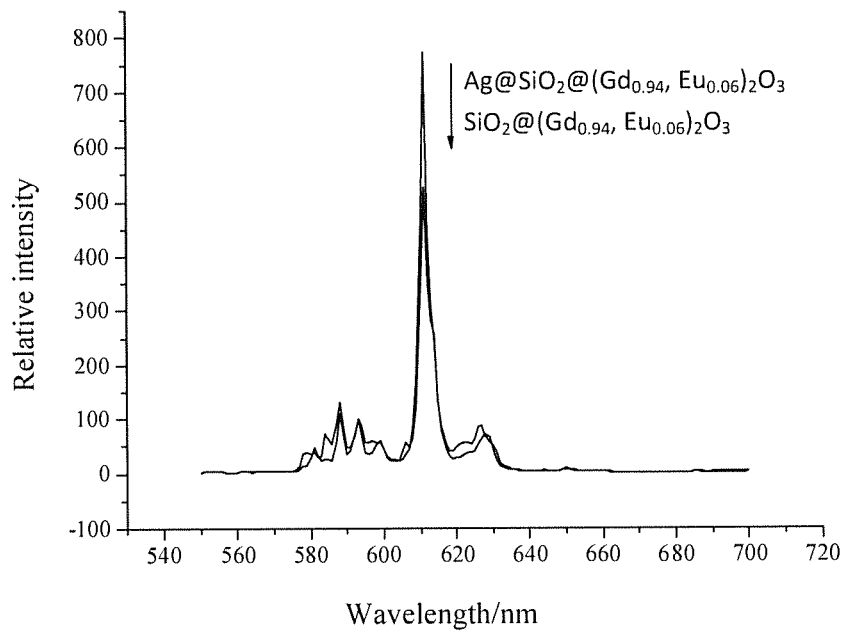
FIG. 7 shows a photoluminescence spectrum of the fluorescent material according to example 8 comparing with a conventional fluorescent material.

FIG. 7 shows a photoluminescence spectrum of the Ag@SiO$_2$@(Gd$_{0.94}$, Eu$_{0.06}$)$_2$O$_3$ according to example 8 comparing with a conventional SiO$_2$@(Gd$_{0.94}$, Eu$_{0.06}$)$_2$O$_3$. As shown in FIG. 7, the integral area of luminescence spectra of Example 8 is 1.48 times of that of the conventional fluorescent material, which shows that, under a light-induced condition, the dual core-shell fluorescent materials greatly enhance the luminous intensity by the core metal Ag particles, thus facilitating the application in the product such as photoluminescence device.

Figure 8:
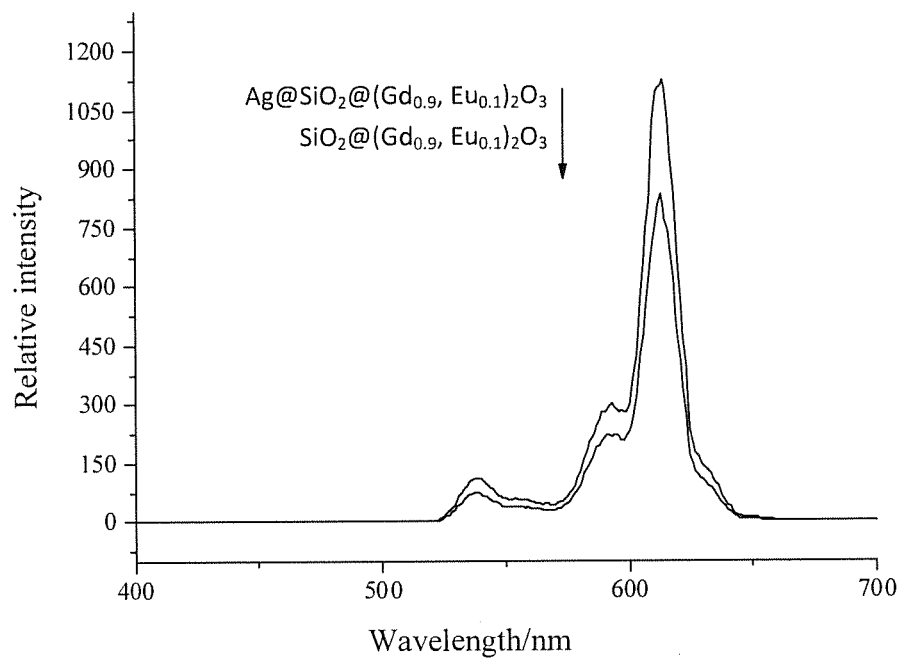
FIG. 8 shows a cathode ray luminescence spectrum of the fluorescent material according to example 8 comparing with a conventional fluorescent material.

FIG. 8 shows a cathode ray luminescence spectrum of the Ag@SiO$_2$@(Gd$_{0.94}$, Eu$_{0.06}$)$_2$O$_3$ according to example 8 comparing with a conventional SiO$_2$@(Gd$_{0.94}$, Eu$_{0.06}$)$_2$O$_3$. As shown in FIG. 8, the integral area of luminescence spectra of Example 8 is 1.37 times of that of the conventional fluorescent material, which shows that, under a cathode ray excited condition, the dual core-shell fluorescent materials greatly enhance the luminous intensity by the core metal Ag particles, thus facilitating the application in the product such as field emission devices device.

Figure 9:
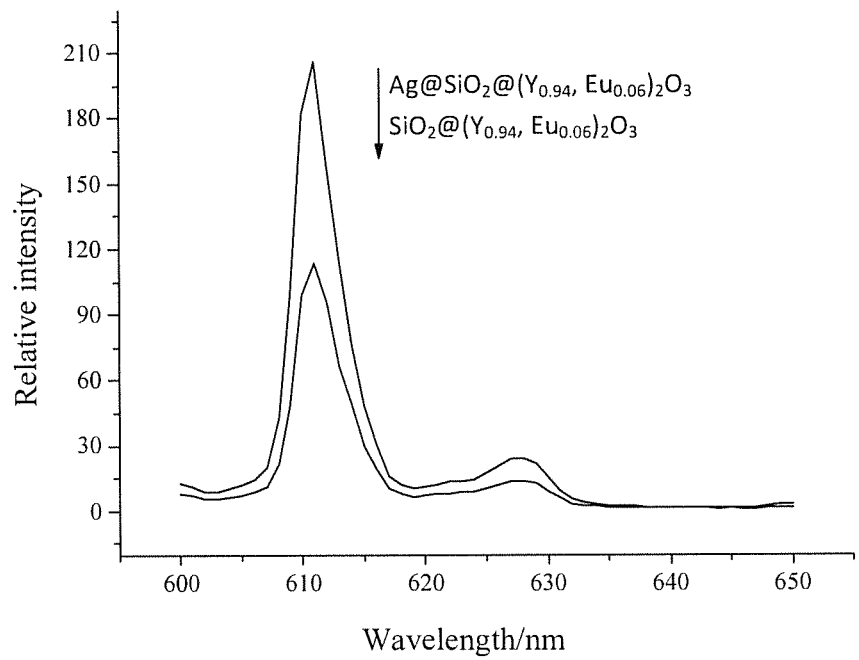
FIG. 9 shows a photoluminescence spectrum of the fluorescent material according to example 13 comparing with a conventional fluorescent material.

FIG. 9 shows a photoluminescence spectrum of the Ag@SiO$_2$@(Gd$_{0.94}$, Eu$_{0.06}$)$_2$O$_3$ according to example 13 comparing with a conventional SiO$_2$@(Gd$_{0.96}$, Eu$_{0.06}$)$_2$O$_3$. As shown in FIG. 9, the integral area of luminescence spectra of Example 13 is 1.85 times of that of the conventional fluorescent material, which shows that, under a light-induced condition, the dual core-shell fluorescent materials greatly enhance the luminous intensity by the core metal Ag particles, thus facilitating the application in the product such as photoluminescence device.

Figure 10:
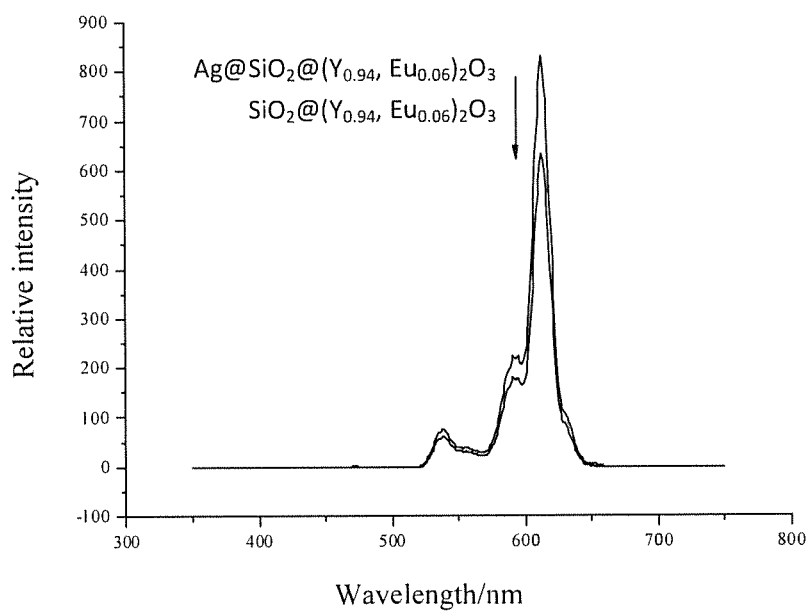
FIG. 10 shows a cathode ray luminescence spectrum of the fluorescent material according to example 13 comparing with a conventional fluorescent material.

FIG. 10 shows a cathode ray luminescence spectrum of the Ag@SiO$_2$@(Gd$_{0.94}$, Eu$_{0.06}$)$_2$O$_3$ according to example 13 comparing with a conventional SiO$_2$@(Gd$_{0.94}$, Eu$_{0.06}$)$_2$O$_3$. As shown in FIG. 10, the integral area of luminescence spectra of Example 13 is 1.34 times of that of the conventional fluorescent material, which shows that, under a cathode ray excited condition, the dual core-shell fluorescent materials greatly enhance the luminous intensity by the core metal Ag particles, thus facilitating the application in the product such as field emission devices device.

In summary, according to FIG. 2 to FIG. 10, the double core-shell fluorescent material according to the present disclosure exhibits a greater luminous intensity. In addition, according to FIG. 5 to FIG. 10, whether under photoluminescence or cathode excitation light-emitting conditions, the double core-shell fluorescent material can also exhibit a greater luminous intensity. The luminous conditions described above are given only as an example, and the double core-shell fluorescent material of the present invention is not limited to the above light emitting devices in practical applications.

Furthermore, according to the Examples, the obtained double core-shell fluorescent material is shaped as non-reunion or less reunion spherical particle, which has a better application performance. The particle size distribution uniformity and stability of the fluorescent material is increased, such that the fluorescent materials exhibit a uniform and stable luminous performance. Moreover, the amount of the phosphor can be saved. Referring to the preparation method, the double core-shell fluorescent material is obtained by sol-gel method or precipitation method with two steps of coating, which is simple, easy to control, and has a low cost, thus having broad prospects for production applications.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A double core-shell fluorescent material, comprising: an inner core, an inner shell coating the outer surface of the inner core, and an outer shell coating the inner shell, the inner core is a metal particle, the chemical composition of the inner shell is silicon dioxide, and the outer shell is a phosphor represented by the chemical formula $(R_{1-x}, Eu_x)_2O_3$, wherein R is Y, Gd or a combination thereof, $0.02 \leq x \leq 0.1$.

2. The double core-shell fluorescent material according to claim 1, wherein the metal particle is made of at least one of Ag, Au, Pt, and Pd.

3. The double core-shell fluorescent material according to claim 1, wherein the particle size of the metal particle is in a range of 20 nm to 100 nm.

4. The double core-shell fluorescent material according to claim 1, wherein the inner core is coated by the inner shell to form an inner-coating structure, the inner-coating structure is a microsphere structure.

5. The double core-shell fluorescent material according to claim 1, wherein the outer shell covers the surface of the inner shell in a form of layer, and the double core-shell fluorescent material is a spherical or spherical-like particle.

6. A preparation method of a double core-shell fluorescent material, comprising the following steps:
   obtaining a metal particle sol;
   dissolving the metal particle sol into an alcohol solvent and weak alkaline solution, adding tetraethyl orthosilicate to react and preparing a suspension in which silicon dioxide coats a metal particle as an inner shell;
   preparing a mixture solution containing at least one of yttrium nitrate and gadolinium nitrate with europium nitrate, adding a precipitant or gel, dissolving each nitrate salt and the precipitant or gel utilizing solvent, and adding the suspension in which silicon dioxide coats a metal particle as a inner shell to obtain a precursor of the double core-shell fluorescent material; and
   calcining the precursor of the double core-shell fluorescent material to form a phosphor outer shell coating the silicon dioxide inner shell and represented by the following chemical formula: $(R_{1-x}, Eu_x)_2O_3$, wherein R is Y, Gd or a combination thereof, $0.02 \leq x \leq 0.1$, and obtaining the double core-shell fluorescent material.

7. The preparation method of a double core-shell fluorescent material according to claim 6, after obtaining the metal particle sol, further comprising surface treating the metal particle sol using surfactant with a concentration of 0.001 g/ml to 0.01 g/ml with stirring for 3 hours to 12 hours.

8. The preparation method of a double core-shell fluorescent material according to claim 6, further comprising repeating the step of obtaining the precursor of the double core-shell fluorescent material, during each repetition, using the previous obtained precursor to replace the suspension in which silicon dioxide coats the metal particle as the inner shell, to obtain the phosphor outer shell with desire thickness.

9. The preparation method of a double core-shell fluorescent material according to claim 6, after preparing the mixture solution containing at least one of yttrium nitrate and gadolinium nitrate with europium nitrate, further comprising adding urea or oxalic acid as a precipitating agent, mixing and dissolving the urea and oxalic acid, adding the suspension in which silicon dioxide coats a metal particle as a inner shell, adjusting the pH value utilizing ammonia, magnetic stirring for 0.5 hour to 1.5 hours, generating precipitate, filtering, washing, drying, and obtaining the precursor having a outer shell composed by europium, yttrium and/or gadolinium oxalate.

10. The preparation method of a double core-shell fluorescent material according to claim 6, after preparing the mixture solution containing at least one of yttrium nitrate and gadolinium nitrate with europium nitrate, further comprising dissolving the mixture solution of nitrate salt with a solvent, adding citric acid and polyethylene glycol, the amount of the added citric acid is determined by a molar ratio of the citric acid to the metal ions in the metal particle sol of 1.2:1 to 5:1, and the amount of the added polyethylene glycol is determined that a concentration of the polyethylene glycol of 0.08 g/ml to 0.2 g/ml, and stirring and reacting in a water bath of 30° C. to 60° C. for 4 hours to 8 hours to form a phosphor sol; adding the phosphor sol to the suspension in which silicon dioxide coats a metal particle as a inner shell, continuing to stir and reaction in a water bath of 60° C. to 90° C. for 3 hours to 12 hours to obtain a gel.

11. The preparation method of a double core-shell fluorescent material according to claim 6, after preparing the suspension in which silicon dioxide coats a metal particle as a inner shell, further comprising purifying, dispersing and dissolving the suspension, the purification step comprises: centrifugal separating the suspension, washing with distilled water or anhydrous ethanol to remove remaining weak alkaline solution and residual tetraethyl orthosilicate; the dispersion and dissolving step comprises: dispersing the suspension of the purification step in distilled water using ultrasonic to obtain a purified suspension.

12. The preparation method of a double core-shell fluorescent material according to claim 6, after preparing the suspension in which silicon dioxide coats a metal particle as a inner shell, further comprising adding surface modifier to the suspension with magnetic stirring, the volume ratio of the surface modifier to the suspension is in a range of 5:1000 to 2:100, the magnetic stirring is for 2 hours to 4 hours to obtain a surface modified suspension.

13. The preparation method of a double core-shell fluorescent material according to claim 6, wherein the precursor of the double core-shell fluorescent material is calcined at a temperature from 600° C.-1400° C. for 1 hour to 6 hours.

* * * * *